United States Patent
Leng

(10) Patent No.: US 8,534,029 B2
(45) Date of Patent: Sep. 17, 2013

(54) PANEL WITH PAPER HONEYCOMB CORES AS TABLE TOP

(75) Inventor: Luhao Leng, Fujian (CN)

(73) Assignee: New-Tec Integration (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 13/326,347

(22) Filed: Dec. 15, 2011

(65) Prior Publication Data

US 2012/0121847 A1    May 17, 2012

Related U.S. Application Data

(63) Continuation of application No. 11/815,504, filed on Aug. 3, 2007, now abandoned, which is a continuation of application No. PCT/CN2004/001131, filed on Oct. 8, 2004.

(30) Foreign Application Priority Data

Oct. 8, 2003   (CN) ..................... 2003 2 0106046 U

(51) Int. Cl.
*A47B 13/08* (2006.01)
*E04C 2/54* (2006.01)

(52) U.S. Cl.
USPC ................. 52/796.11; 52/792.1; 52/783.1

(58) Field of Classification Search
USPC  52/782.2, 783.1, 782.1, 793.1, 796.11–797.1; 428/73; 108/161
See application file for complete search history.

(56) References Cited

U.S. PATENT DOCUMENTS

| | | | | |
|---|---|---|---|---|
| 2,840,430 A * | 6/1958 | Winer | ...... | 52/793.11 |
| 2,901,304 A * | 8/1959 | Fihe | ...... | 108/169 |
| 2,911,274 A * | 11/1959 | Grube | ...... | 52/782.2 |
| 3,095,943 A * | 7/1963 | Kemp | ...... | 181/292 |
| 3,450,593 A * | 6/1969 | Fossier et al. | ...... | 428/73 |
| 3,458,193 A * | 7/1969 | Rockwood et al. | ...... | 473/22 |
| 3,676,279 A * | 7/1972 | Beaver | ...... | 428/73 |
| 4,696,071 A * | 9/1987 | Santo | ...... | 5/679 |
| 4,845,916 A * | 7/1989 | Villard | ...... | 52/792.1 |
| 4,879,152 A * | 11/1989 | Green | ...... | 428/73 |
| 4,931,340 A * | 6/1990 | Baba et al. | ...... | 428/73 |
| 5,034,256 A * | 7/1991 | Santiso et al. | ...... | 428/73 |
| 5,623,882 A * | 4/1997 | Price | ...... | 108/129 |
| 5,947,037 A * | 9/1999 | Hornberger et al. | ...... | 108/115 |

(Continued)

FOREIGN PATENT DOCUMENTS

JP    2000024734 A  *  1/2000
JP    2000094078 A  *  4/2000

*Primary Examiner* — Joshua J Michener
*Assistant Examiner* — Elizabeth A Plummer
(74) *Attorney, Agent, or Firm* — Rabin & Berdo, P.C.

(57) ABSTRACT

The present invention discloses a table top comprising a top panel, a bottom panel, a paper honeycomb core and an internal fixed part. The paper honeycomb core is enclosed between and fixed to the top panel and the bottom panel. The paper honeycomb core is completely surrounded by the internal fixed part, or the internal fixed part is installed in a suitable position of the panel, serving as a reinforced frame of the panel. The edge of the bottom panel and the lower edge of the top panel bended downwardly are cohered together, and the bended edge of the top panel forms the side edge of the panel. The top panel and the bottom panel may be formed by suction molding or direct molding process. The panel can be connected with other parts of the table.

9 Claims, 16 Drawing Sheets

(56) References Cited

U.S. PATENT DOCUMENTS

| | | | |
|---|---|---|---|
| 5,983,807 A * | 11/1999 | Tarnay et al. | 108/132 |
| 6,058,854 A * | 5/2000 | Tarnay et al. | 108/161 |
| 6,743,497 B2 * | 6/2004 | Ueda et al. | 428/73 |
| 6,824,851 B1 * | 11/2004 | Locher et al. | 428/76 |
| 6,837,171 B1 * | 1/2005 | Clark et al. | 108/131 |
| 7,698,872 B2 * | 4/2010 | Clark et al. | 52/783.1 |
| 7,779,595 B2 * | 8/2010 | Polk, Jr. | 52/571 |
| 8,176,858 B2 * | 5/2012 | Leng | 108/193 |
| 2008/0295454 A1 * | 12/2008 | Leng | 53/80 |
| 2009/0117318 A1 * | 5/2009 | Leng | 428/73 |

* cited by examiner

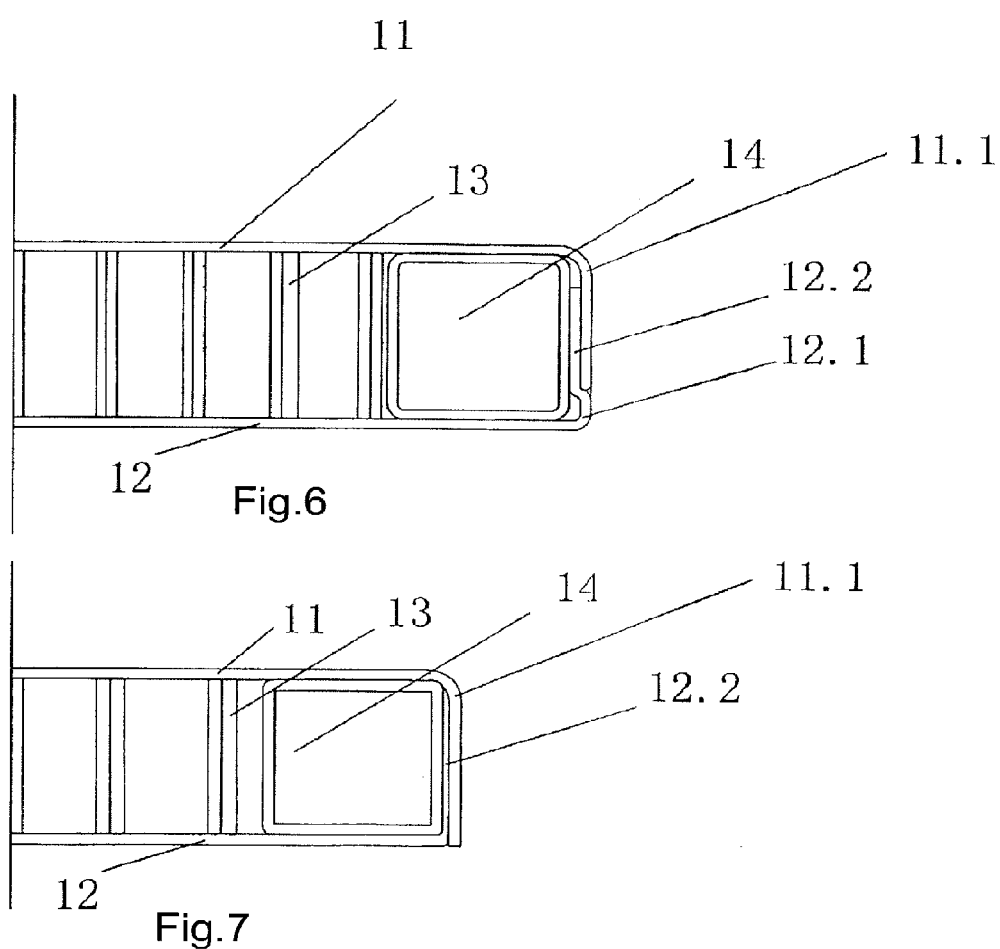

PANEL WITH PAPER HONEYCOMB CORES AS TABLE TOP

This application is a Continuation of U.S. application Ser. No. 11/815,504 which is a Continuation of PCT application No. PCT/CN2004/001131 filed Oct. 8, 2004.

FIELD OF THE INVENTION

This invention relates to daily necessities for furniture, especially an edge-sealed table top panel with paper honeycomb cores.

DESCRIPTION OF THE PRIOR ART

Tables are one of the necessities using for family and offices, and there are a great variety of tables with broad applications, such as tables for work and study, council boards for various meetings, small family dining tables, big dining tables for hotel and restaurant, leisure tables for recreation and entertainment, as well as computer tables. The table is generally made up of a top panel and supporting table legs. A key part of a table, the top panel is used for writing, handling official business, having dinner and placing articles. Currently, most of the top panels of indoor and outdoor products such as office table, dining table, council board, leisure table and computer table are made of wood, fiber board or particle board, and some blow moulding plastic plate. The raw material of aforementioned table top panels is mostly wood, which will be greatly limited by restrictions to tree cutting as forest resource is decreasing. On the other hand, there are some drawbacks for the table top panel made of woody materials. For example, it is too heavy to move a fiber board of medium density and too vulnerable to maintain a particle board as it is week in strength. What's more, it is hard to clean such top panel due to its poor moisture resistance. Meanwhile, the cost of table top panel made of woody materials is higher as a result of expensive raw material. Although the table top panel made of one-piece blow moulding plastic plate is light in weight, it is expensive in manufacturing and difficult in changing shape.

The existing paper honeycomb core panels are mainly used in the package of fragile articles or stack board for transportation, and the furniture made of them is poor in appearance; besides, the present honeycomb cardboard can not be nailed, drilled or connected with other parts to become furniture or products. But as the large honeycomb paper provides adequate compressive strength and light weight, it is an appropriate environmentally friendly product with broad perspectives in furniture and office furniture.

SUMMARY OF THE INVENTION

This invention is intended to overcome the technical roadblocks and provide a lightweight edge-sealed table top panel with paper honeycomb cores, which is environmentally friendly, beautiful, highly strong, cost-effective, and easy to clean.

According to the present invention, there is provided a technical solution to said roadblocks: An edge-sealed table top panel with paper honeycomb cores comprising a top panel, a bottom panel, paper honeycomb cores and an internal fixed part, in which the paper honeycomb cores are filled in the closed space which is enclosed by the top panel and the bottom panel, and are fixed with the top panel and the bottom panel by glue; the peripheries of the paper honeycomb cores are completely or partially surrounded by the internal fixed part, which can be positioned against the paper honeycomb cores; the edge of top panel bends and extends downwardly, covering the side edge of internal fixed part or upper edge of the bottom panel, and the lower edge of top panel is jointed with the upper edge of the bottom panel.

The internal fixed part is mainly used for connection and reinforcement and can either form a close inner frame in shapes of rectangle, round and ellipse, or a frame like U-shape frame or two parallel bars along long edges of the top panel. Of course, instead of forming an inner frame, it can only be set in positions necessary for reinforcement or connection. For example, it can be set fully or partially along the inner side of outer edge of panel. The internal fixed part can be pipe fittings, section bars or plates. The paper honeycomb is allowed to be compressed in small area; therefore, if the plate internal fixed part is set partially, it can be overlapped on the paper honeycomb cores directly and need not to make room by honeycomb paper core. If the pipe fittings or section bars are used as internal fixed part, normally the paper honeycomb cores shall make room for them in the set position, or make a concave cavity in the bottom panel to place the internal fixed part. The position of internal fixed part and paper honeycomb cores can be set upon request by fixing the top panel and bottom panel with the paper honeycomb cores.

The said internal fixed part is pipe fitting or extrusion section bar or injection-molded fittings or composite work piece constituted by hardware and it can be used to enhance the connection strength of reinforced table leg mechanism and table top panel.

The top panel and bottom panel are made by suction moulding process or contour machining process; and the former technique features not only in simple equipment but also in that decorative process such as grain pasting may be undertaken to the top panel.

One of the connection methods of top panel and bottom panel in this invention is that the edge of bottom panel bends upwardly and partially covers the internal fixed part, and the edge of top panel bends downwardly and covers the side edge of internal fixed part and edge of bottom panel, with the side edge of top panel fixed to bottom panel at the side edge of internal fixed part.

One of the connection methods of top panel and bottom panel in this invention is that the edge of bottom panel lays against the bottom line of the internal fixed part and is fixed to the center of the bottom line of internal fixed part, while the edge of top panel bends downwardly and covers the side edge of internal fixed part and is fixed to the edge of bottom panel at the bottom line of internal fixed part.

One of the connection methods of top panel and bottom panel in this invention is that the edge of starting end of upwardly bending bottom panel protrudes the top panel at a thickness of top panel and extends upwardly; meanwhile, the side of downwardly bending top panel is bonded to the upwardly extension section of bottom panel and forms a plane with the protruding section. This structure can be in invert order, i.e. the top panel protrudes the bottom panel at an approximate thickness of side edge of bottom panel.

The said paper honeycomb cores can be of one-piece located in the center of internal fixed part, or several pieces inside or outside of internal fixed part.

The said paper honeycomb cores are made of monolayer paper honeycomb core. The said paper honeycomb cores are made of monolayer honeycomb cardboard which is composed of paper honeycomb cores, top sheet and bottom sheet, wherein the paper honeycomb core is held between and bonded to the top sheet and bottom sheet.

The said paper honeycomb core is made by two-layer or multilayer honeycomb cardboard, all layers of which are fixed together, and the shape and size of honeycomb cardboard in each layer can be different. The honeycomb cardboard is composed of paper honeycomb core, top sheet and bottom sheet, wherein the paper honeycomb core is held between and bonded to the top sheet and bottom sheet.

The shape of said top panel and bottom panel is square or rectangle or round or ellipse or triangle or polygon or profiled, or can be designed by requirement for table.

The said bottom panel can also be of one-piece with several reinforcing ribs to reinforce the strength of table top panel.

According to the present invention, there is provided another technical solution to said roadblocks: An edge-sealed table top panel with paper honeycomb cores comprising a top panel, a bottom panel, paper honeycomb cores and an internal fixed part, in which the paper honeycomb cores are filled in the closed space which is enclosed by the top panel and the bottom panel, and are fixed with the top panel and the bottom panel by glue; the internal fixed part is installed at the connection position of table top panel and table leg or other parts, and can be positioned against paper honeycomb cores; with the edge of top panel bends and extents downwardly and the upper edge of the bottom panel bends and extends upwardly, the lower edge of top panel is bonded and fixed to upper edge of the bottom panel.

The internal fixed part is also mainly used for connecting and reinforcing and can either form a close inner frame in shapes of rectangle, round and ellipse, or a frame like U-shape frame or two parallel bars along long edges of the top panel. Of course, instead of forming an inner frame, it can only be set in positions necessary for reinforcement or connection. It can be set fully or partially along the shape of outer side of the panel. The internal fixed part can be pipe fittings, section bars or plates. The paper honeycomb is allowed to be compressed in small area; therefore, if the plate internal fixed part is set partially, it can be overlapped on the paper honeycomb cores directly and need not to make room by honeycomb paper core. If the pipe fittings or section bars are used as internal fixed part, normally the paper honeycomb cores shall make room for them in the set position. The position of internal fixed part and paper honeycomb cores can be set upon request by bonding the top panel and bottom panel with the paper honeycomb cores.

Another technical method to achieve purpose of this invention is to convert the above mentioned internal fixed part to an outside frame, and embed the paper honeycomb core plate into the frame, thus forming a table panel with the outside frame and core plate; the paper honeycomb cores may either contain none or one internal fixed part to enhance the partial strength. It means that the table top panel is composed of outside frame and paper honeycomb core plate, with the paper honeycomb cores filled between the top panel and bottom panel to form a paper honeycomb core plate which is then embedded into the outside frame to form the table top panel, and the table leg is connected to the outside frame of table top panel.

In addition, the bar of the said outside frame has an inward concave step, into which the paper honeycomb core plate is embedded, with the honeycomb cardboard embedded into the outside frame.

In manufacturing, the top panel and bottom panel may be made of monolayer plastic plate or multilayer plastic plate and processed directly to desired shape and size of table top panel; when adopting the monolayer plastic plate, the plate thickness may be around 0.3 mm-4 mm and the material can be ABS, PP, PS, PE, etc.; when adopting the multilayer plastic plate, the thickness of plastic plate can be about 0.3 mm-4 mm, for example, the plastic plate can be composite sheet compounded by 0.1 mm-0.3 mm ASA and 0.3 mm-3.5 mm ABS. The paper honeycomb cores can be monolayer paper honeycomb core or monolayer honeycomb cardboard or two-layer honeycomb cardboard, or multilayer honeycomb cardboard; when adopting two-layer or multilayer honeycomb cardboard, the size and shape of each layer of honeycomb cardboard can either be identical or variant. Put the paper honeycomb cores between the plastic top panel and plastic bottom panel, and fix it to plastic top panel and plastic bottom panel respectively with glue. The surroundings of the paper honeycomb cores are completely covered by internal fixed part, which forms an outside frame; said internal fixed part can be pipe fittings or extrusion section bar and injection-molded fittings or composite work piece constituted by hardware and it can be used to enhance the connection strength of reinforced table leg mechanism and table top panel, therefore, the internal fixed part shall be the reinforced frame of table top panel, and may only be used for connecting rather than strengthening enhancing the connection strength of table leg mechanism and table top panel. The internal fixed part can be fixed together by glue with honeycomb paper cores or they can not be unnecessarily fixed; the edge of top panel and the edge of bottom panel or connection of bottom panel is fixed by glue and the edge of bottom panel and connection of internal fixed part is fixed by glue, forming a complete table top panel whose edge is made by bending of top panel.

The beneficial effect of this invention is as follows. Firstly, as the lightweight paper honeycomb core is used as the filling between top panel and bottom panel, i.e. the core of table top panel, the finished table top panel is light in weight. Secondly, the internal fixed part such as core set in the paper honeycomb cores is completely or partially covered with composite work piece made of pipe fittings or extrusion section bars, or composite work piece constituted by pipe fitting or extrusion section and injection-molded fittings or hardware, enabling connection between the table top panel and other parts like table leg mechanism. Furthermore, it may be used as the reinforced frame of table top panel to greatly enhance the strength of table top panel. This invention particularly adopts the above mentioned edge-sealed structure in top panel and bottom panel, which makes the paper honeycomb core plate good-looking and is useful in improving the production efficiency.

Since the top panel and bottom panel are formed by monolayer plastic plate or multilayer plastic composite plate made by suction moulding process or contour machining process, the table top panel can be designed in various shapes upon requirement without further processing and is easy to clean and strong in moisture resistance; the edge of table top panel is formed by bending panel, ensuring a more smooth and beautiful table top panel which is quite flat and seamless without bonding gap. An edge-sealed table top panel with environmentally friendly paper honeycomb cores which is made of invert suction moulding process is characterized by light weight, high strength, easy maintenance, cost-effectiveness and beautiful appearance.

BRIEF DESCRIPTION OF THE DRAWINGS

Hereinafter, the present invention will be described by way of illustrative examples with reference to the accompanying drawings, but the edge-sealed table top panel with paper honeycomb cores made of invert suction moulding process in this invention is not limited to the embodiments.

FIG. 6 is the schematic drawing of edge-sealed structure of this invention in embodiment 3.

FIG. 7 is the schematic drawing of edge-sealed structure of this invention in embodiment 4.

DESCRIPTION OF THE PREFERRED EMBODIMENTS

Figure 1:
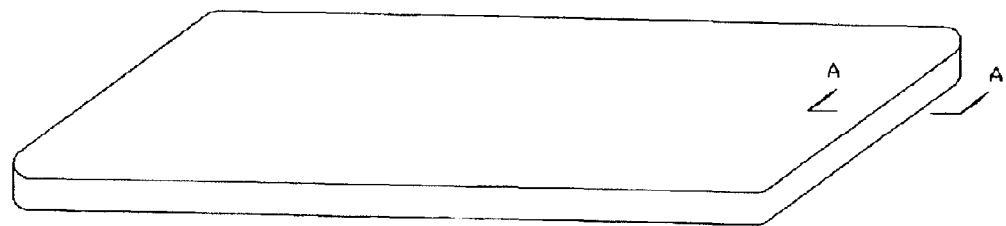
FIG. 1 is the schematic diagram of shape of this invention in embodiment 1.
Figure 2:
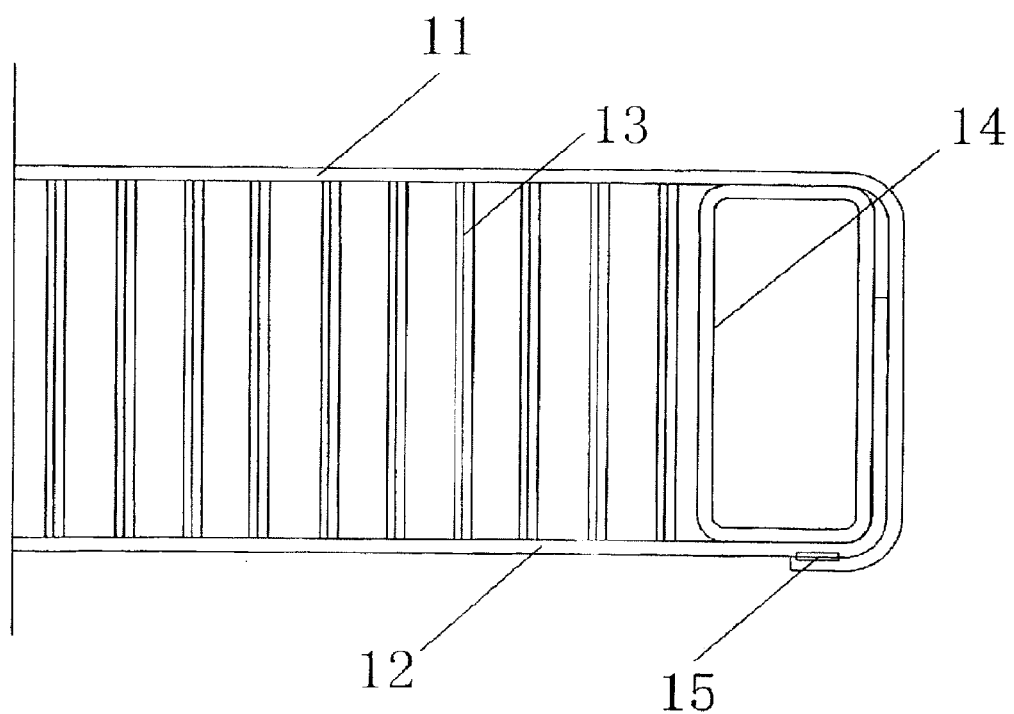
FIG. 2 is the sectional elevation of partial structure along the A-A line in FIG. 1.
Figure 3:
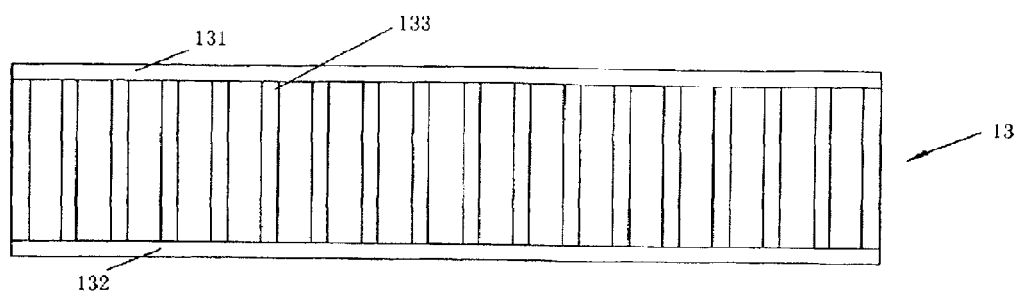
FIG. 3 is the sectional elevation of paper honeycomb cores of this invention in embodiment 1.
Figure 4:
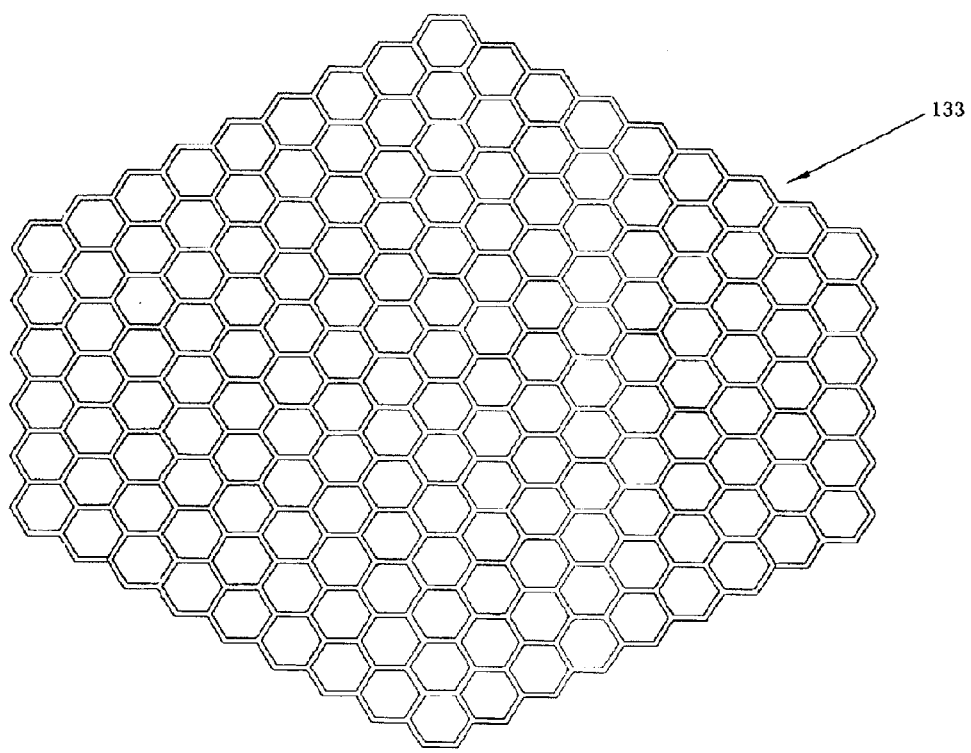
FIG. 4 is the top view of paper honeycomb cores of this invention in embodiment 1.

As shown from FIG. 1 to FIG. 4, an edge-sealed table top panel with paper honeycomb cores made of invert suction moulding process according to embodiment 1, is composed of plastic top panel 11, plastic bottom panel 12, paper honeycomb core 13 and internal fixed part 14, wherein the plastic top panel 11 and plastic bottom panel 12 are square, making the table top panel made of said panels is also a square one; the plastic top panel 11 and the plastic bottom panel 12 are formed by suction moulding process or contour machining process; the thickness of plastic top panel 11 and plastic bottom panel 12 is about 0.3 mm-4 mm; when the plastic top panel 11 and plastic bottom panel 12 are processed to be a square with desired size, fill the paper honeycomb core 13, composed of paper honeycomb element 133, top sheet 131 and bottom sheet 132, between plastic top panel 11 and plastic bottom panel 12; it is known that the paper honeycomb core can only be provided with the paper honeycomb core, without top sheet and bottom sheet. The paper honeycomb element 133 is held between and bonded to top sheet 131 and bottom sheet 132, while the paper honeycomb core 13 is filled between and bonded to plastic top panel 11 and plastic bottom panel 12 in glue. The internal fixed part 14, bonded to honeycomb paper core 13 with glue, completely covers the paper honeycomb core 13 to form an inner frame for connecting and reinforcing The edge of plastic bottom panel 12 bends upwardly and covers the bottom line and part of the side edge of internal fixed part 14, and the edge of plastic top panel 11 bends downwardly and covers the upper edge and side edge of internal fixed part 14 and the edge of plastic bottom panel 12; the edge of plastic top panel 11 is fixed to plastic bottom panel 12 at lower edge 15 of internal fixed part 14 with glue. The internal fixed part 14 is the reinforced frame of table top panel, which may not only greatly enhance the strength of table top panel, but also the connection strength between table top panel and table leg mechanism; the edge of table top panel is formed by bending the top panel, making it quite smooth and beautiful, therefore a one-piece square table top panel is formed.

During processing, the top panel 11 and bottom panel 12 may be monolayer plastic plate or multilayer plastic plate, and can directly be processed to desired shape and size. Its shape is square. When using the monolayer plastic plate, the plate thickness may be around 0.3 mm-4 mm and the material can be ABS, PP, Ps, PE, etc. When using the multilayer plastic plate, the thickness of plastic plate can be about 0.3 mm-4 mm; for example, the plastic plate can be composite sheet made of 0.1 mm-0.3 mm ASA and 0.3 mm-3.5 mm ABS. The paper honeycomb core 13 is monolayer honeycomb cardboard, and the honeycomb cardboard 13 is composed of paper honeycomb element 133, top sheet 131 and bottom sheet 132; the paper honeycomb element 133 is held between and fixed to the top sheet 131 and bottom sheet 132; the paper honeycomb core 13 is filled between and fixed to the plastic panel 11 and plastic bottom panel 12 respectively by glue: the surroundings of the paper honeycomb core 13 are covered by internal fixed part 14, the reinforced frame of table top panel, enhancing the connection strength between table leg mechanism and table top panel; the internal fixed part 14 and paper honeycomb core 13 are fixed together by glue, and the edge of plastic panel 11 is bonded to plastic bottom panel 12 by glue.

Figure 5:
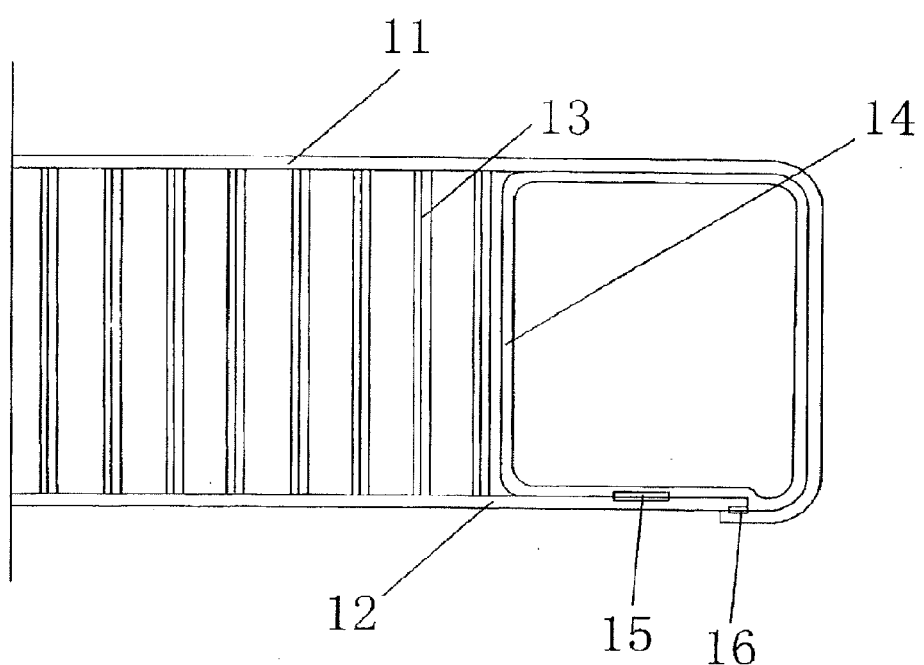
FIG. 5 is the sectional elevation of partial structure of this invention in embodiment 2.

Embodiment 2: as shown in FIG. 5, an edge-sealed table top panel with paper honeycomb cores made of invert suction moulding process in the present invention comprising plastic panel 11, plastic bottom panel 12, paper honeycomb core 13 and internal fixed part 14. The difference between embodiment 1 and 2 lies in that a step is set at the lower part of the internal fixed part 14, the edge of plastic bottom panel 12 lays against the bottom line of internal fixed part and is fixed to bottom line of internal fixed part 14 at the center 15 of bottom line of internal fixed part 14 with glue; the edge of plastic panel 11 bends downwardly and covers the side edge of internal fixed part 14 and is fixed to edge of plastic bottom panel 12 at the bottom line 16 of internal fixed part 14 with glue, thus a square table top panel is formed, wherein the internal fixed part 14 is the reinforced frame of table top panel, not only enhancing the strength of table top panel, but also the connection strength between table top panel and table leg mechanism, The edge of table top panel is formed by bending of plastic panel 11, making the edge of table top panel quite smooth and beautiful.

Embodiment 3-8: as shown in FIG. 6-11, the following embodiments present and illustrate in detailed six kinds of edge-sealed structure of table top panel of this invention.

Embodiment 3, as shown in FIG. 6: The table top panel is composed of top panel 11, bottom panel 12, paper honeycomb cores 13 and internal fixed part 14; the top panel 11 and bottom panel 12 form a close space filled with paper honeycomb core which is bonded to top panel 11 and bottom panel 12 or either of them; the internal fixed part 14 is set inside all edges or partial edges of table top panel and remains the same height as paper honeycomb core; the edge of starting end of edge of bottom panel 12 bending upwardly protrudes the top panel at a thickness of 12.1, and then extends internally and upwardly a length of 12.2; the downwardly bending side 11.1 of top panel 11 bonds to the upper extension section 12.2 of bottom panel and forms a plane with 12.1. Of course, this structure can be in invert order, i.e. the top panel protrudes the bottom panel at an approximate thickness of bottom panel.

Embodiment 4, as shown in FIG. 7: The table top panel is composed of top panel 11, bottom panel 12, paper honeycomb core 13 and internal fixed part 14; the downwardly bending edge of top panel 11 and the upwardly bending edge of bottom panel 12 form a close space filled with paper honeycomb core which is bonded to top panel 11 and bottom panel 12 or either of them, internal fixed part 14 is set inside all edges or partial edges of table top panel and keeps the same height as paper honeycomb core.

Figure 8:
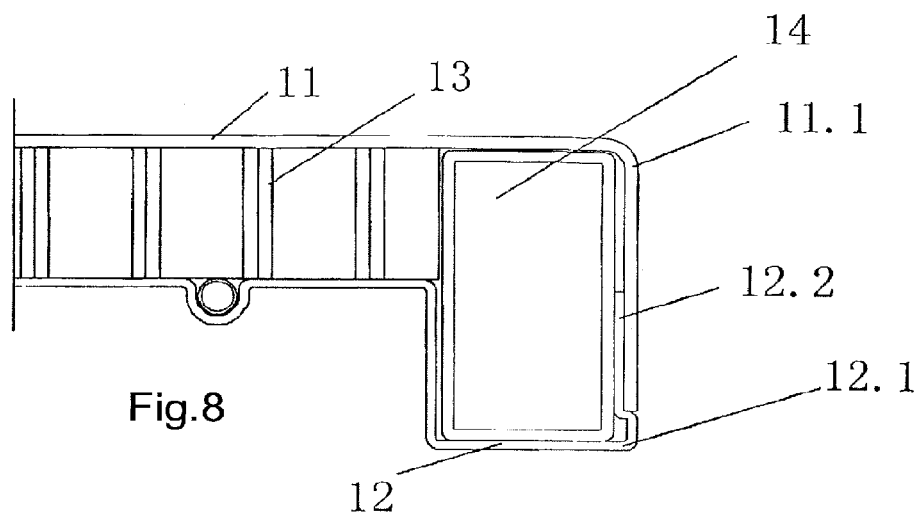
FIG. 8 is the schematic drawing of edge-sealed structure of this invention in embodiment 5.
Figure 9:
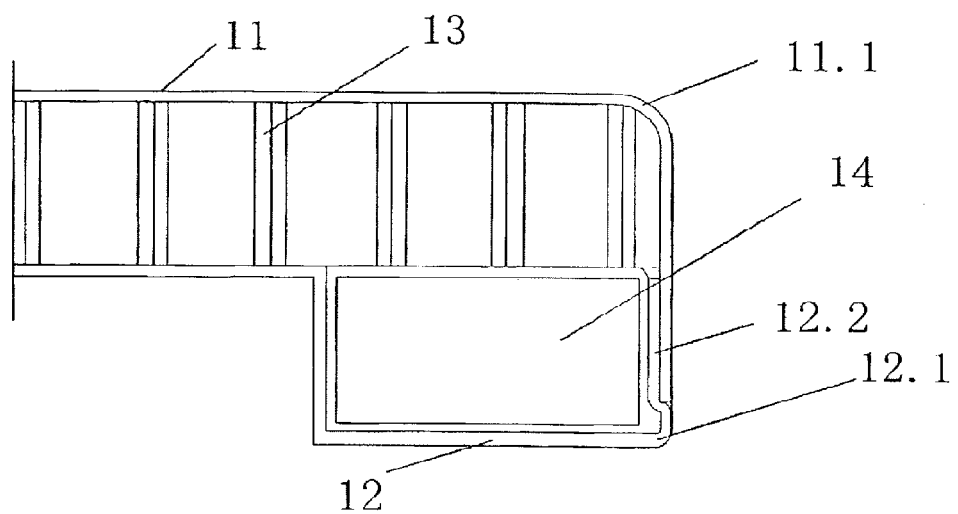
FIG. 9 is the schematic drawing of edge-sealed structure of this invention in embodiment 6.

Embodiment 5: as shown in FIG. 8: The table top panel is composed of top panel 11, bottom panel 12, honeycomb paper core 13 and internal fixed part 14; the edge of top panel 11 bends downwardly; the upwardly bending edge of bottom panel 12 forms a cavity and then bends upwardly, forming a close space filled with paper honeycomb core which is bonded to top panel 11 and bottom panel 12; the internal fixed part 14 is set at the edge between the top panel 11 and bottom panel 12 with its height larger than the thickness of paper honeycomb core. Therefore the outer edge of such table top panel is thicker than the middle plate, which may not only enhance the strength of edge of table top panel but also looks beautiful, satisfying the requirements for a general top panel. The connection structures of side top panel and bottom panel are the same as that in embodiment 3, i.e. a protruding section is set at the side of bottom panel.

Embodiment 6: as shown in FIG. 8: The table top panel is composed of top panel 11, bottom panel 12, honeycomb paper core 13 and internal fixed part 14; the edge of top panel 11 bends downwardly; the upwardly bending edge of bottom panel 12 forms a cavity and then bends upwardly, forming a close space filled with paper honeycomb core which is bonded to top panel 11 and bottom panel 12 or either of them; the internal fixed part 14 is set inside the cavity of the bottom panel 12 below the honeycomb paper at the edge of top panel. Likewise, the thickness of outer edge of table top panel in this structure is larger than that in the center, making it beautiful in appearance. Furthermore, the position of such internal fixed part will not certainly be set in the outer edge; as long as a cavity in the proper position of bottom panel is saved, the internal fixed part can be embedded in the cavity and used for connection of the table top panel.

Figure 10:
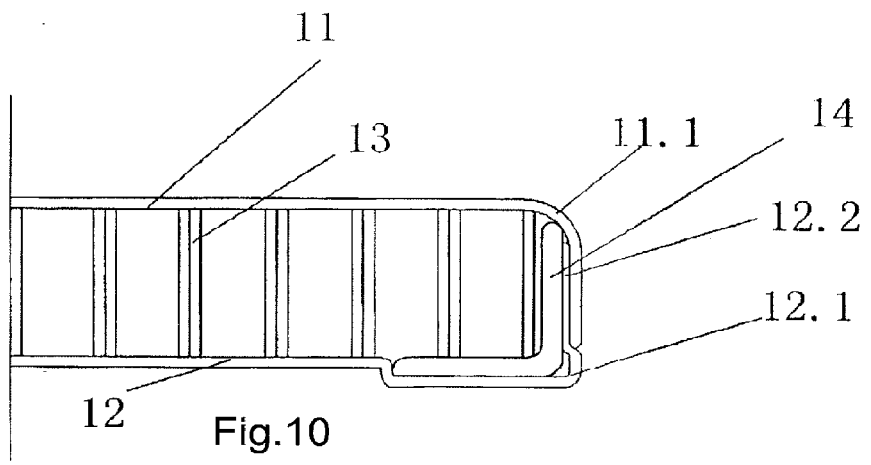
FIG. 10 is the schematic drawing of edge-sealed structure of this invention in embodiment 7.

Embodiment 7: as shown in FIG. 10: The structure of table top panel is similar to the afore-mentioned. The internal fixed part 14 is of angular shape made of angle iron or plastic materials, therefore, the edge of bottom panel 12 needs only to dent a little to insert the internal fixed part 14, or the room can be made for internal fixed part 14 by directly compressing the paper honeycomb cores with outside force instead of forming a concave cavity; also, the starting end of side of upwardly bending of bottom panel bends upwardly at a position protruding the top panel at the thickness of top panel and forms a protruding section 12.1 and then extends upwardly and internally a length of 12.2, the extending part is bonded and fixed to the side of top panel 11, and the top panel 11 and the protruding section of bottom panel form a plane.

Figure 11:
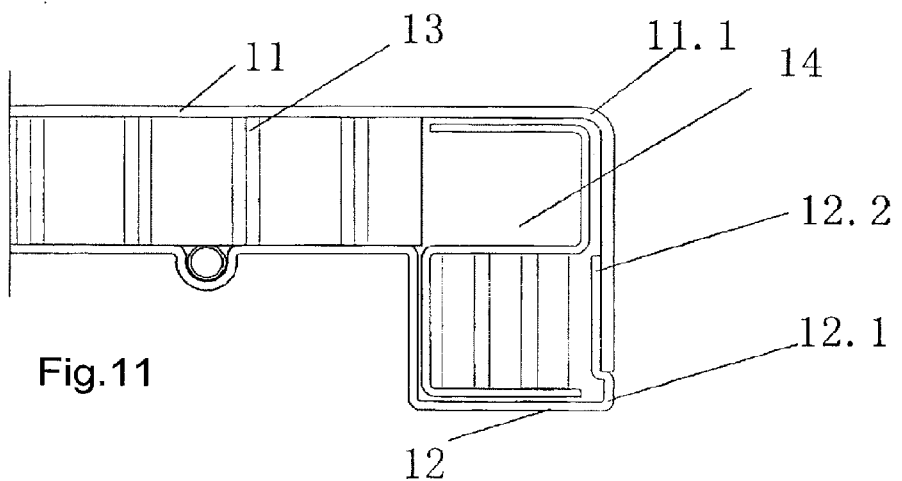
FIG. 11 is the schematic drawing of edge-sealed structure of this invention in embodiment 8.

Embodiment 8: as shown in FIG. 11, it is characterized by the S shape of internal fixed part and the paper honeycomb core may also be filled in the S shape space inside the internal fixed part 14 in order to enhance its strength.

Embodiments 9-16 show detailed description of the overall structure of table top panel.

Figure 12:
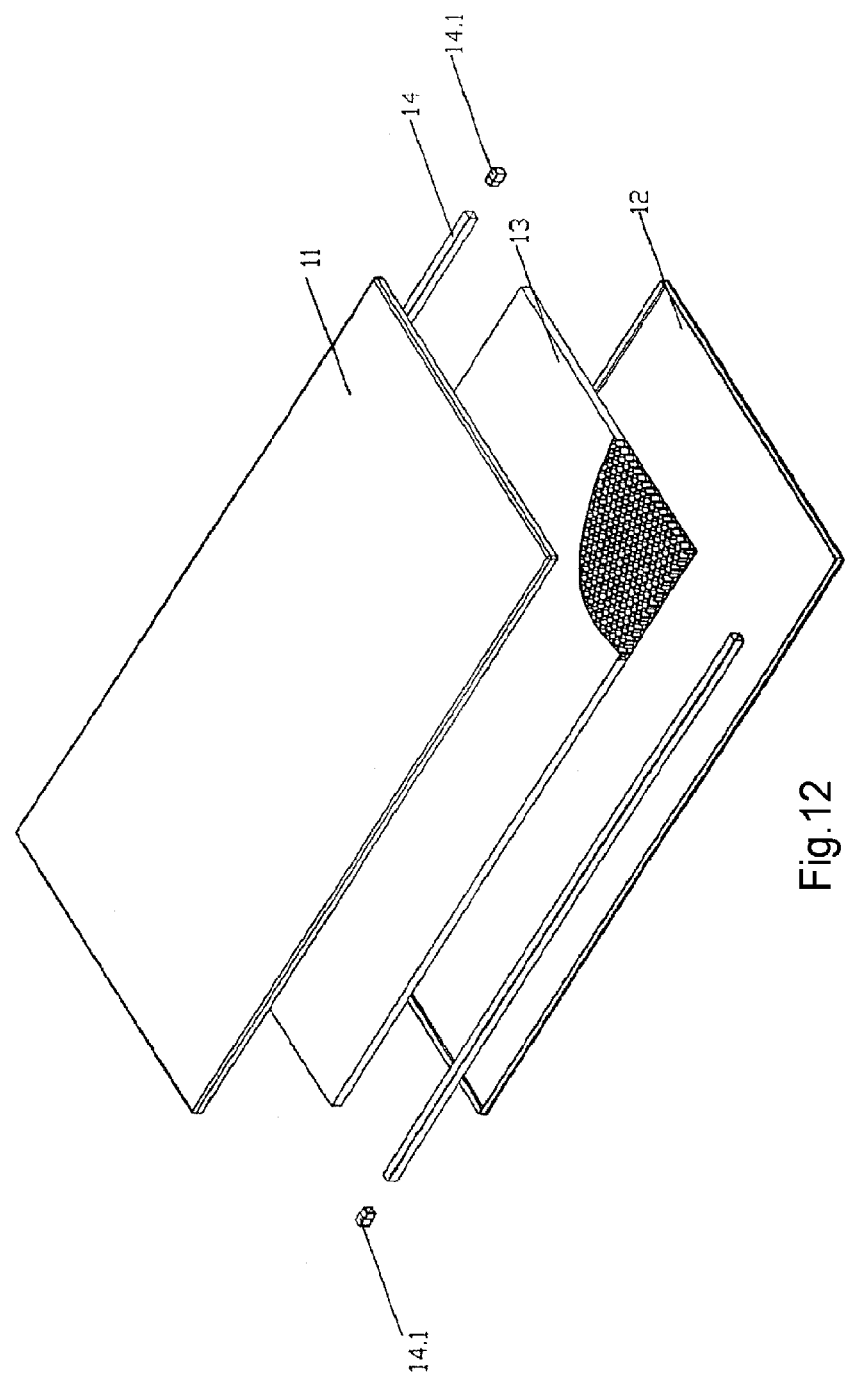
FIG. 12 is the schematic drawing of structure of internal fixed part and paper honeycomb cores in embodiment 9 of this invention.

Embodiment 9: as shown in FIG. 12: The table top panel is composed of top panel 11, bottom panel 12, paper honeycomb core 13 and internal fixed part 14; the top panel 11 and bottom panel 12 form a close space with paper honeycomb core and internal fixed part filled inside. The internal fixed part 14 is square tube section bar, both ends of which are plugged with plug 14.1 made of plastic or other flexible materials to protect the top panel from damage of the internal fixed part; the internal fixed part 14 is set in the inner edge of two transverse edge of table top panel with its length slightly less than that of tabletop.

Figure 13:
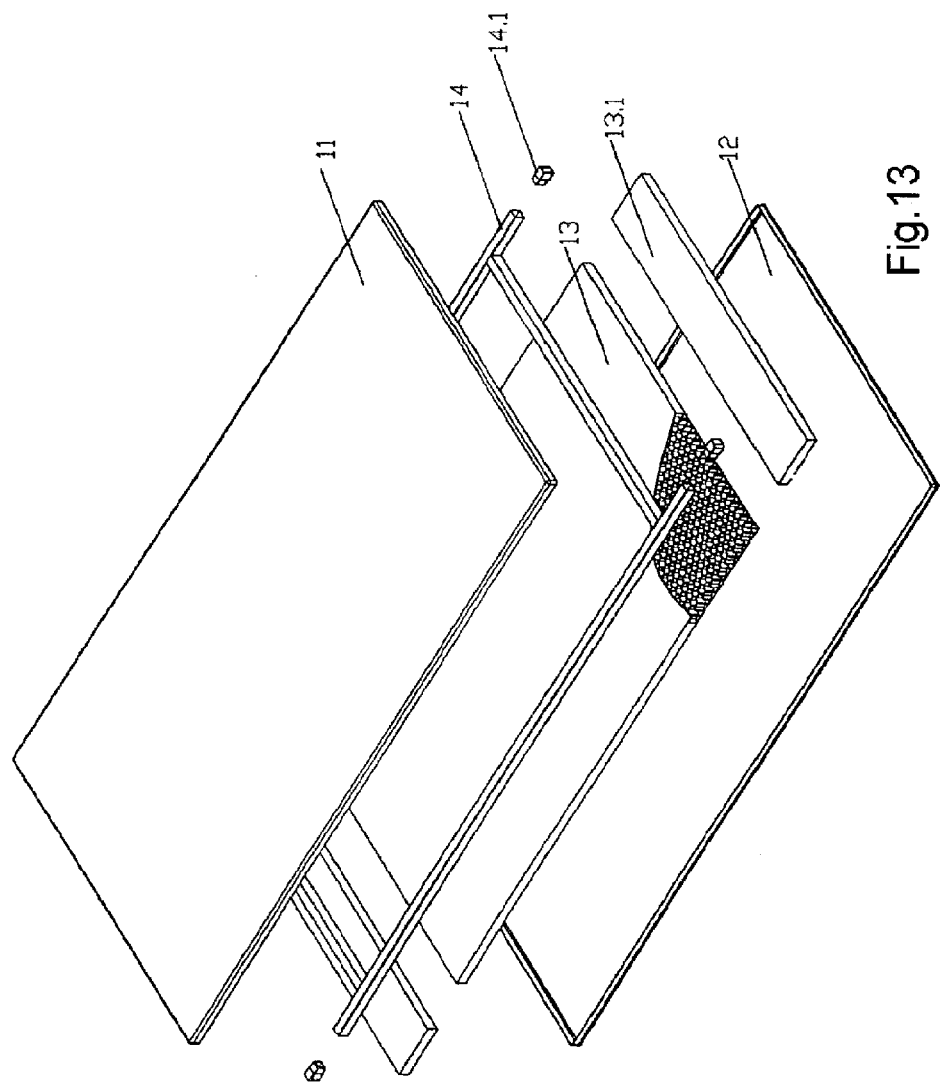
FIG. 13 is the schematic drawing of structure of internal fixed part and paper honeycomb cores in embodiment 10 of this invention.

Embodiment 10, as shown in FIG. 13, the internal fixed part 14 is a close frame and there are three pieces of paper honeycomb cores; the main paper honeycomb core 13 is placed inside the frame of internal fixed part 14 frame and the side paper honeycomb cores are placed outside the frame of internal fixed part 14, the top and bottom of which are bonded and fixed to top panel 11 and bottom frame 13. In this structure, the table legs or other parts are not connected to the internal fixed part at the edge of tabletop.

Figure 14:
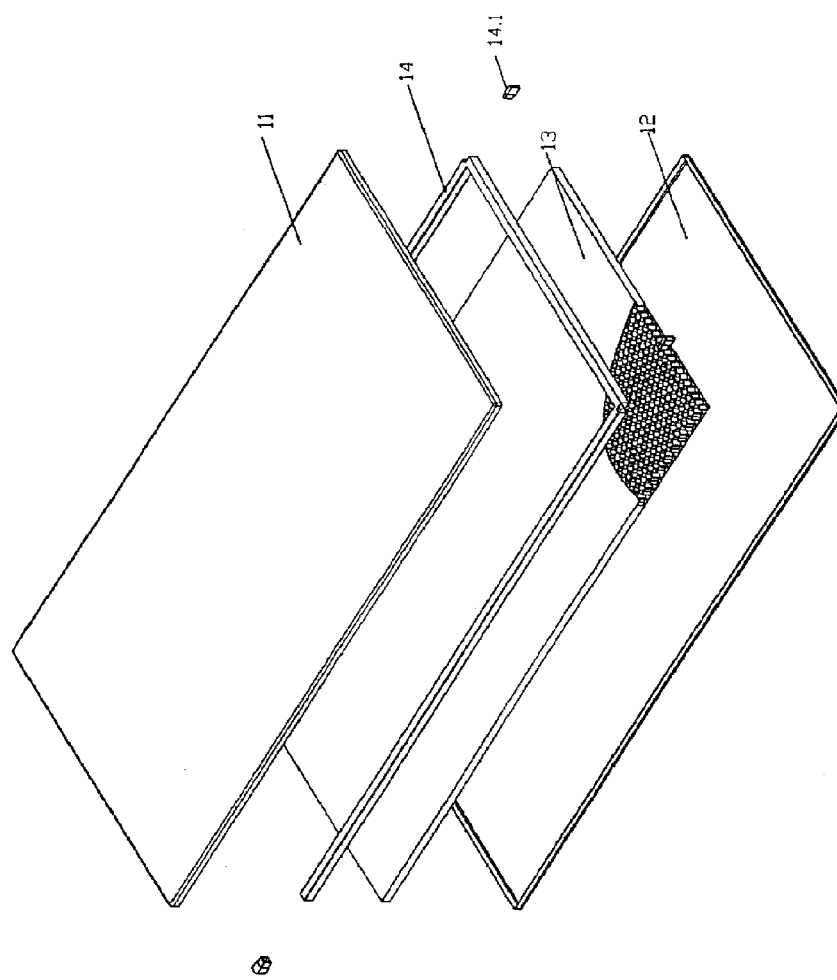
FIG. 14 is the schematic drawing of structure of internal fixed part and paper honeycomb cores in embodiment 11 of this invention.

Embodiment 11, as shown in FIG. 14, the structure is similar to that in embodiment 8, but differs in the U shape of internal fixed part. The plastic plug 14.1 is set in the sharp edge of internal fixed part frame 14.

Figure 15:
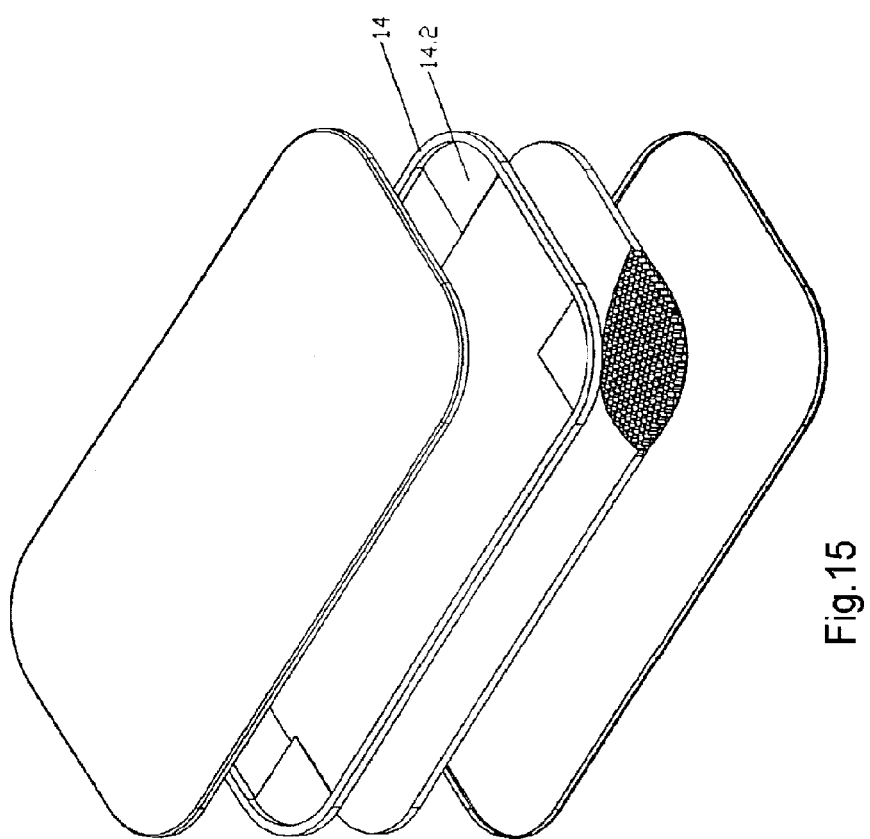
FIG. 15 is the schematic drawing of structure of internal fixed part and paper honeycomb cores in embodiment 12 of this invention.

Embodiment 12, as shown in FIG. 15, it is characterized in that the internal fixed part 14 is not only a close frame, but also is provided with four angles 14.2 extending around the periphery of the frame; the angle 14.2 is plate and welded to lower edge of internal fixed part 14, therefore the paper honeycomb cores need not to make room for angle 14.2, and the internal fixed part frame 14 can be more easily connected to the parts like table legs after connecting with angle 14.2.

Figure 16:
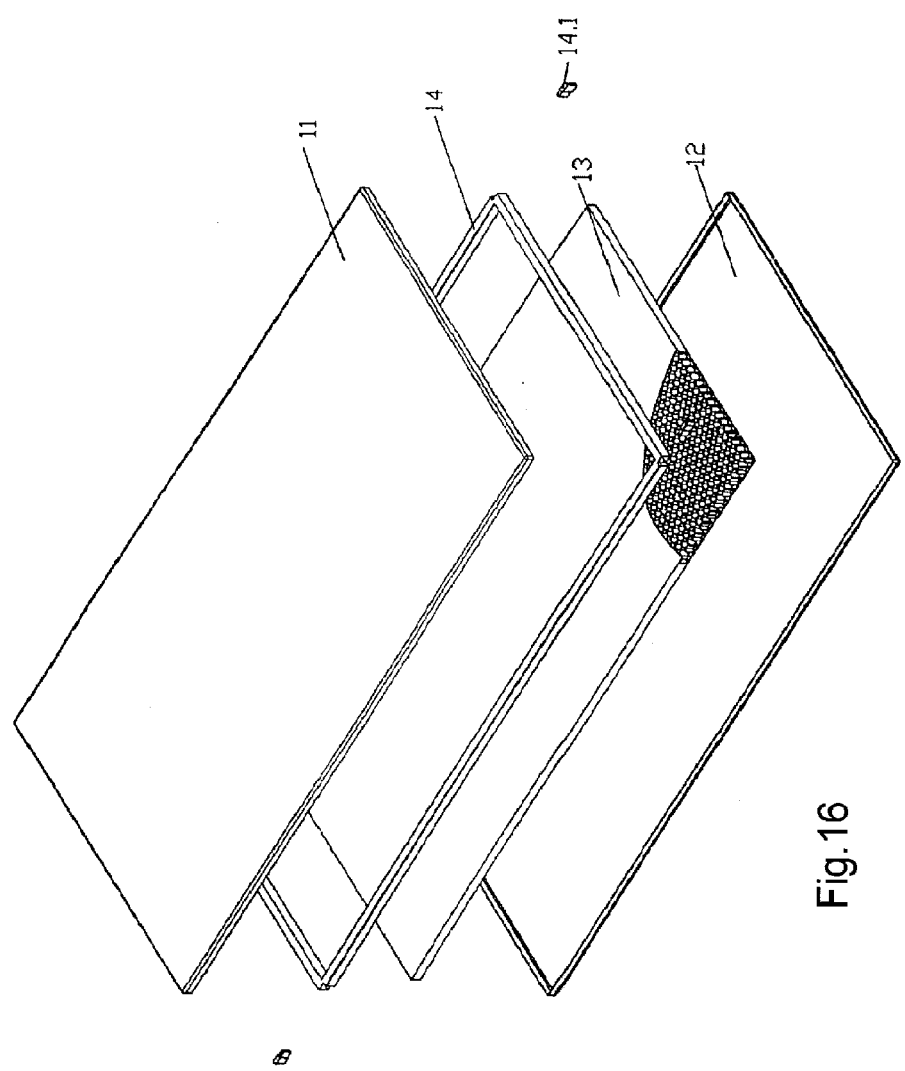
FIG. 16 is the schematic drawing of structure of internal fixed part and paper honeycomb cores in embodiment 13 of this invention.

Embodiment 13, as shown in FIG. 16, it is characterized in that the internal fixed part 14 is a close frame and is placed around the inner edge of table top panel.

Figure 17:
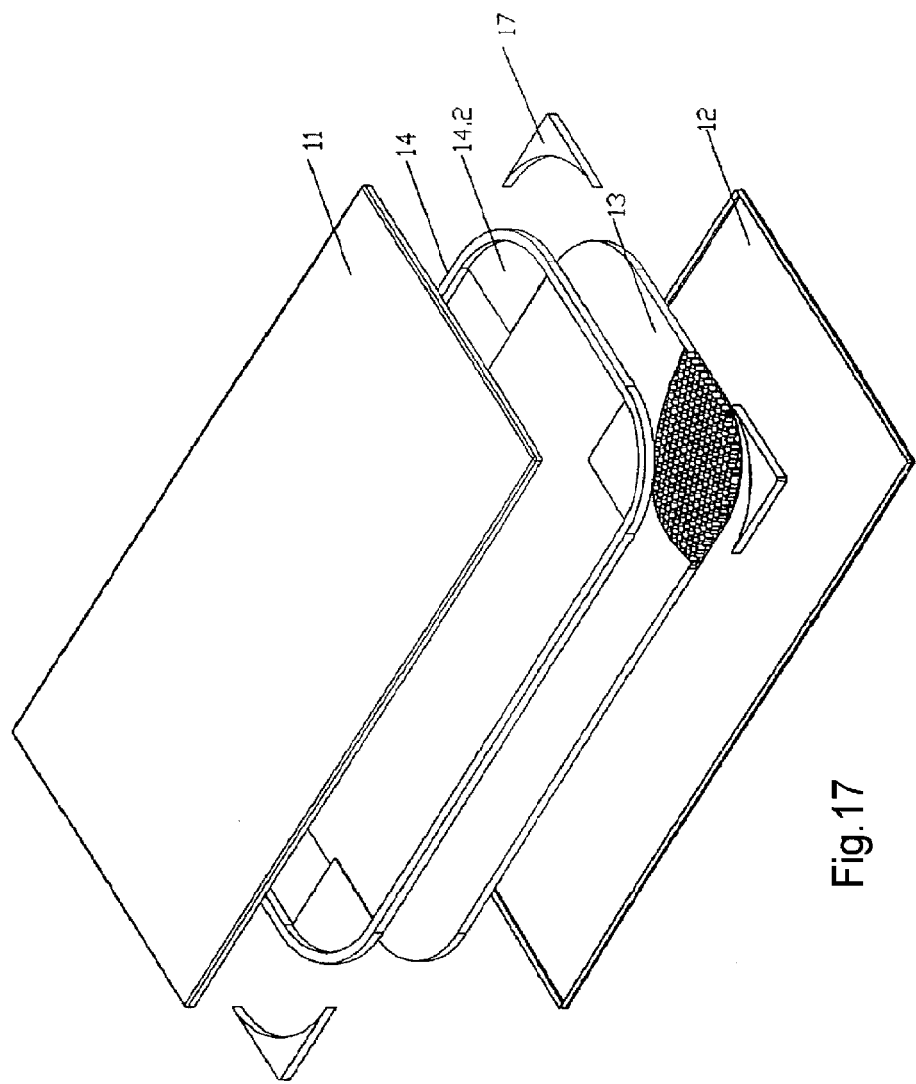
FIG. 17 is the schematic drawing of structure of internal fixed part and paper honeycomb cores in embodiment 14 of this invention.

Embodiment 14, as shown in FIG. 17, the table top panel is rectangle plate, i.e. the top panel 11 and bottom panel 12 are both rectangle plates, and the internal fixed part 14 is race-track shape with angles 14.2 in all sides; the paper honeycomb core is also race-track shape placed inside the internal fixed part 14; the angle of which is situated closely to the bottom panel; there are also four corresponding strutting pieces 17 between the internal fixed part and its housing, which can be paper honeycomb core or plastic work and metalwork.

Figure 18:
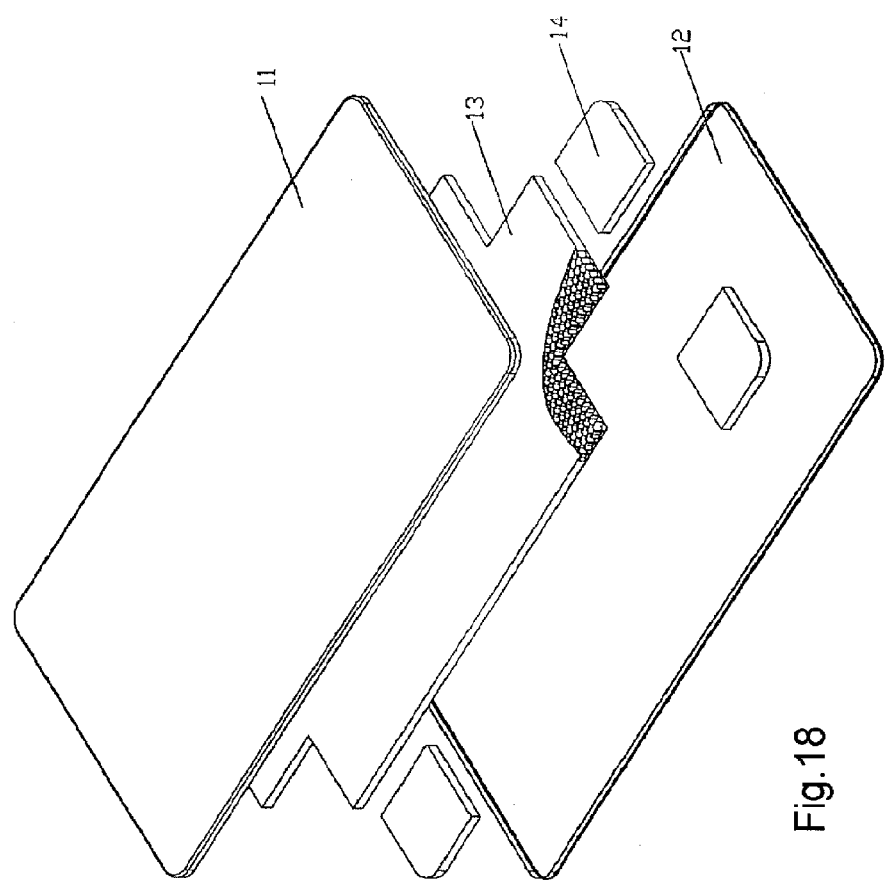
FIG. 18 is the schematic drawing of structure of internal fixed part and paper honeycomb cores in embodiment 15 of this invention.

Embodiment 15, as shown in FIG. 18, it is characterized in that the internal fixed part 14 is set inside the four angles of table top panel, and there are movement notches in four angles of paper honeycomb core 13. The paper honeycomb core 13 and internal fixed part 14 are placed inside the bottom panel with or without glue; once covered by top panel 11, its side is bonded to bottom panel 12, thus forming a table top panel.

Figure 19:
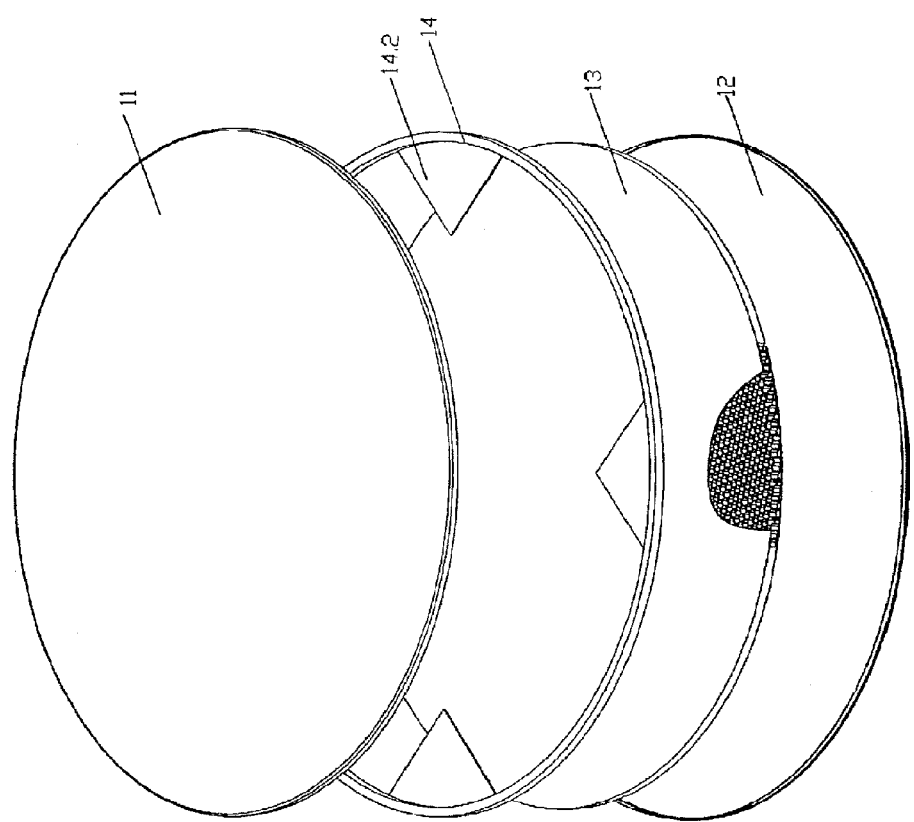
FIG. 19 is the schematic drawing of structure of internal fixed part and paper honeycomb cores in embodiment 16 of this invention.

Embodiment 16, as shown in FIG. 19, a round table top panel which is also composed of top panel 11, bottom panel 12, internal fixed part 14, paper honeycomb core 13 and internal fixed part 14; there are four angles 14.2 in both circumference and diagonal of internal fixed part circle 14, and both the angle 14.2 and internal fixed part 14 are made of steel; the angle 14.2 is welded to the lower edge of internal fixed part frame 14, and the angle 14.2 is a plate; put the paper honeycomb core 13 into the internal fixed part 14 and bond the bottom panel 12 and top panel 11 to form a round table top panel.

Figure 20:
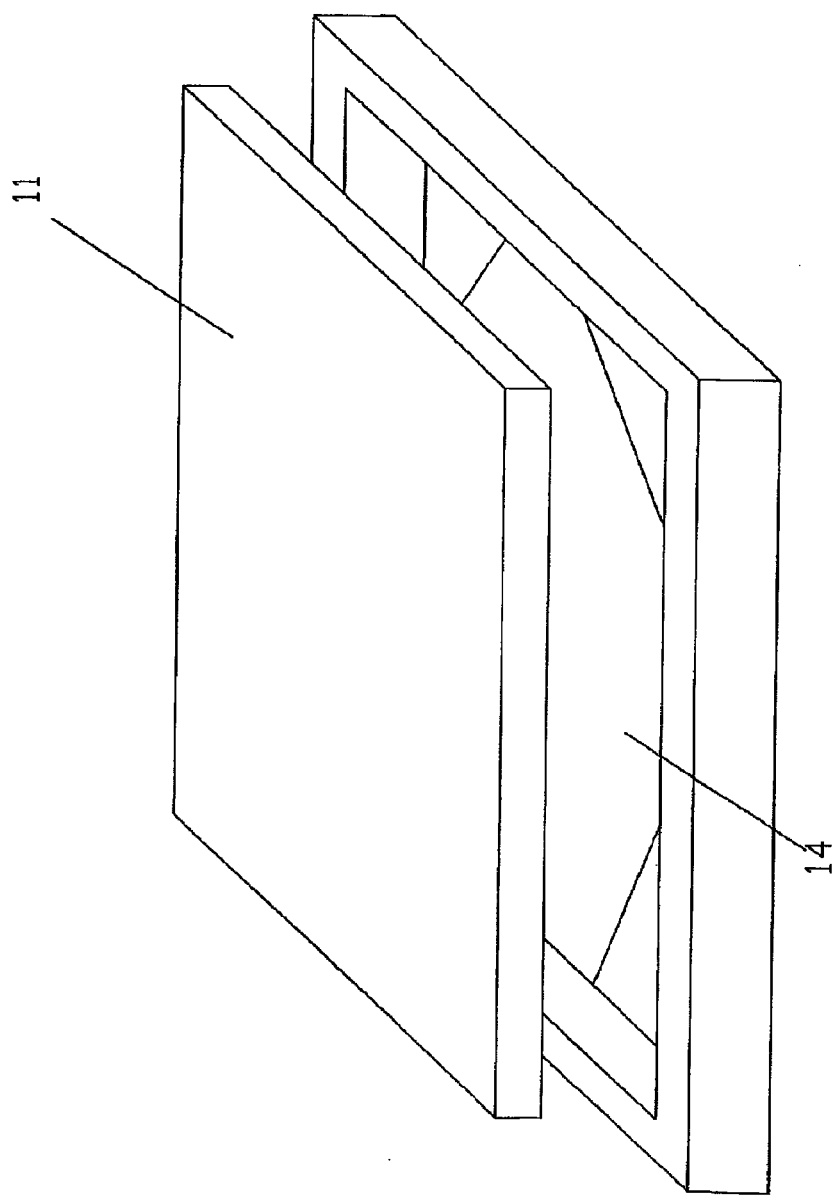
FIG. 20 is the schematic drawing of structure illustrating connection of paper honeycomb cores plate and outside frame in embodiment 17 of this invention.

Embodiment 17: As shown in FIG. 20, this internal fixed part is used as the structure of outside frame in which the table top panel may only be composed of top panel 11, bottom panel 12 and paper honeycomb core 13, paper honeycomb core 13 is placed in the space constituted by top panel 11 and bottom panel 12, and bonded to them, the connection of which is an outside frame with a step in inner edge, and then put the composite plate on the outside frame step to form a table top panel. The afore-mentioned are the embodiments of this invention and the structure of table top panel with paper honeycomb cores may also be used in other furniture like bookcase, wardrobe, etc., which shall also be covered and protected in this invention.

INDUSTRIAL APPLICABILITY

The table top panel with paper honeycomb cores in this invention is made of paper honeycomb core, featuring in light weight, less material consumption and less environmental resources consumption; this table top panel may also used to connect with mechanisms like table leg; meanwhile, it is good-looking and meets the consumption requirements of human being; furthermore, the top panel resin of the tabletop is made by suction moulding process, ensuring a low cost and a easy modification to the shapes.

What is claimed is:

1. A table top comprising:
    a top panel;
    a bottom panel;
    a paper honeycomb core having a core upper side and a core lower side, the core upper side glued to the top panel, the core lower side glued to the bottom panel, the core upper side and the core lower side defining a core thickness; and
    a hollow internal support part having a rectangular cross-section, an upper side and a lower side, the upper side and the lower side defining a height corresponding to the core thickness, the hollow internal support part further having an inner side and an outer side, the inner side affixed to a side of the paper honeycomb core so that the upper side is level with the core upper side and the lower side is level with the core lower side,
    wherein the bottom panel has a bottom edge bending upwardly at a joint of the lower side and the outer side and partially covering the outer side of the hollow internal support part;
    wherein the top panel has a top edge bending downwardly and covering the bottom edge of the bottom panel, extending inwardly at the joint, and fixed to the bottom panel,
    wherein the top edge of the top panel and the bottom edge of the bottom panel are attached to each other,
    wherein the top panel or the bottom panel is a plastic plate, and
    wherein the hollow internal support part forms a closed frame; and the internal support part does not extend around the entire perimeter of the table top.

2. The table top according to claim 1, wherein the closed frame follows a shape of an outer edge of the top panel.

3. The table top according to claim 1, wherein the table top has a rectangular shape, wherein two opposite sections of the internal support part are located internally between two edges of the table top and a center of the table top so that the paper honeycomb core has a plurality of pieces and wherein at least one of the plurality of pieces of the paper honeycomb core is located inside the closed frame.

4. The table top according to claim 1, wherein the paper honeycomb core is a monolayer paper honeycomb core.

5. The table top according to claim 4, wherein the paper honeycomb core comprises a monolayer honeycomb cardboard, a top sheet and a bottom sheet, the paper honeycomb cardboard is held between and fixed to the top sheet and bottom sheet with glue.

6. The table top according to claim 1, wherein the internal support part is located at one or more positions where the table top connects with additional structures of a table.

7. The table top according to claim 6, wherein the internal support part is set completely along the outer edge of the top panel.

8. A method for manufacturing a table top which comprises a top panel, a bottom panel, a paper honeycomb core having a core upper side and a core lower side and a hollow internal support part having a rectangular cross-section, an upper side, a lower side, an inner side and an outer side, the method comprising:
    assembling the hollow internal support part to surround the paper honeycomb core,
    attaching the inner side of the hollow internal support part to the side of the paper honeycomb core so that the upper side is level with the core upper side and the lower side is level with the core lower side;
    placing the paper honeycomb core and the hollow internal support part between the top panel and the bottom panel, wherein the internal support part does not extend around the entire perimeter of the table top;
    gluing the core upper side to the top panel and the core lower side to the bottom panel;
    bending a bottom edge of the bottom panel upwardly at a joint of the lower side and the outer side to partially cover the outer side of the hollow internal support part;
    bending a top edge of the top panel downwardly to cover the bottom edge of the bottom panel;
    extending the top edge of the top panel inwardly at the joint; and
    attaching the top edge of the top panel to the bottom panel.

9. The method of claim 8, wherein the table top has a rectangular shape, wherein two opposite sections of the internal support part are located internally between the two other edges of the table top and a center of the table top so that the paper honeycomb core has a plurality of pieces, and wherein at least one of the plurality of pieces of the paper honeycomb core is located inside the closed frame.

* * * * *